(12) United States Patent
Bian

(10) Patent No.: US 11,163,137 B2
(45) Date of Patent: Nov. 2, 2021

(54) CAMERA OPTICAL LENS

(71) Applicant: AAC Optics Solutions Pte. Ltd., Singapore (SG)

(72) Inventor: Xuqi Bian, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/992,057

(22) Filed: Aug. 12, 2020

(65) Prior Publication Data

US 2021/0048620 A1 Feb. 18, 2021

(30) Foreign Application Priority Data

Aug. 16, 2019 (CN) .......................... 201910760412.8

(51) Int. Cl.
*G02B 13/00* (2006.01)
*G02B 9/12* (2006.01)

(52) U.S. Cl.
CPC .......... *G02B 13/0035* (2013.01); *G02B 9/12* (2013.01)

(58) Field of Classification Search
CPC ...... G02B 13/0035; G02B 9/12; G02B 13/06; G02B 13/18
See application file for complete search history.

(56) References Cited

FOREIGN PATENT DOCUMENTS

| CN | 110073265 | * | 7/2019 | ......... G02B 13/0035 |
| JP | 2006209028 | * | 8/2006 | ............. G02B 13/06 |

* cited by examiner

*Primary Examiner* — Alicia M Harrington
(74) *Attorney, Agent, or Firm* — W&G Law Group

(57) ABSTRACT

The present disclosure relates to the technical field of optical lens and discloses a camera optical lens satisfying following conditions: $10.00<f4/f<31.00$; $2.80<v3/v2<4.00$; $1.60<n4<2.10$; and $5.00<d5/d6<21.00$; where f denotes a focal length of the camera optical lens; f4 denotes a focal length of the third lens; v2 denotes an abbe number of the first lens; v3 denotes an abbe number of the second lens; n4 denotes a refractive index of the d line of the third lens; d5 denotes an on-axis thickness of the second lens, and d6 denotes an on-axis distance from the image-side surface of the second lens to the object-side surface of the third lens. The camera optical lens in the present disclosure satisfies a design requirement of wide angle, large aperture and fingerprint recognition while having good optical performance.

8 Claims, 3 Drawing Sheets

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

Recently, as smart phones spring up, requirement of thinner and smaller camera lens is rising day by day. A general camera lens usual employs charge-coupled device (CCD) or complementary metal-oxide semiconductor sensor (CMOS sensor) as photosensitive device thereof. Due to the improvement of semiconductor manufacturing technology, the pixel size of the photosensitive device is reduced. In addition to current development trend of electronic products going towards better functions and thinner and smaller dimensions, miniature camera lenses with good imaging quality is becoming a mainstream in the market.

In order to obtain better imaging quality, a lens that is traditionally equipped in a mobile phone camera adopts a two-piece lens structure. However, with the development of technology and the diversification of user demand, the pixel area of the photosensitive device is decreasing and the imaging quality of the system is increasing. Accordingly, three-piece lens structure gradually appears in the lens design. Although a lens as such has good optical performance, the lens is fairly unreasonable in terms of setting of optical power, lens shape and distance between lenses, rendering that the lens structure with good optical performance can not satisfy a design requirement of large aperture, wide angle and fingerprint recognition.

SUMMARY

To address the above issues, the present disclosure seeks to provide a camera optical lens that satisfies a design requirement of wide angle, large aperture and fingerprint recognition while having good optical performance.

The technical solutions of the present disclosure are as follows:

A camera optical lens including, from an object side to an image side: a first glass plate; a first lens having a negative refractive power; a second lens having a positive refractive power; a third lens having a positive power; and an image surface; wherein the camera optical lens satisfies following conditions:

$10.00 < f4/f < 31.00;$ $2.80 < v3/v2 < 4.00;$ $1.60 < n4 < 2.10;$ and $5.00 < d5/d6 < 21.00;$ Where f denotes a focal length of the camera optical lens; f4 denotes a focal length of the third lens; v2 denotes an abbe number of the first lens; v3 denotes an abbe number of the second lens; n4 denotes a refractive index of the d line of the third lens; d5 denotes an on-axis thickness of the second lens, and d6 denotes an on-axis distance from the image-side surface of the second lens to the object-side surface of the third lens.

As an improvement, the camera optical lens further satisfies the following condition:

$-5.00 < (R7+R8)/(R7-R8) < -1.40;$ where R7 denotes a curvature radius of an object-side surface of the third lens; and R8 denotes a curvature radius of an image-side surface of the third lens.

As an improvement, the camera optical lens further satisfies the following condition:

$-12.00 < R3/d3 < -8.00;$ where R3 denotes a curvature radius of an object-side surface of the first lens; and d3 denotes an on-axis thickness of the first lens.

As an improvement, the camera optical lens further satisfies the following conditions:

$-2.54 \leq f2/f \leq -0.80;$ $0.42 < (R3+R4)/(R3-R4) < 1.33;$ and $0.04 \leq d3/TD \leq 0.15;$ where f2 denotes a focal length of the first lens; R3 denotes a curvature radius of an object-side surface of the first lens; R4 denotes a curvature radius of an image-side surface of the first lens; d3 denotes an on-axis thickness of the first lens; and TD denotes an on-axis distance from an object-side surface of the first glass plate to the image surface of the camera optical lens.

As an improvement, the camera optical lens further satisfies the following conditions:

$0.51 \leq f3/f \leq 1.85;$ $0.27 \leq (R5+R6)/(R5-R6) \leq 0.89;$ and $0.06 \leq d5/TD \leq 0.18;$ where f3 denotes a focal length of the second lens; R5 denotes a curvature radius of an object-side surface of the second lens; R6 denotes a curvature radius of an image-side surface of the second lens; and TD denotes an on-axis distance from an object-side surface of the first glass plate to the image surface of the camera optical lens.

As an improvement, the camera optical lens further satisfies the following conditions:

$0.02 \leq d7/TD \leq 0.08;$ where d7 denotes an on-axis thickness of the third lens, and TD denotes an on-axis distance from an object-side surface of the first glass plate to the image surface of the camera optical lens.

As an improvement, the camera optical lens further satisfies the following conditions:

$Fov \geq 120.00°;$ where Fov denotes a field of view of the camera optical lens.

As an improvement, the camera optical lens further satisfies the following conditions:

$Fno \leq 1.61;$ where Fno denotes an F number of the camera optical lens.

The present disclosure is advantageous in: the camera optical lens in the present disclosure has good optical performance and has characteristics of wide angle, large aperture and fingerprint recognition, and is especially fit for WEB camera lenses and mobile phone camera lens assemblies composed by such camera elements as CCD and CMOS for high pixels.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
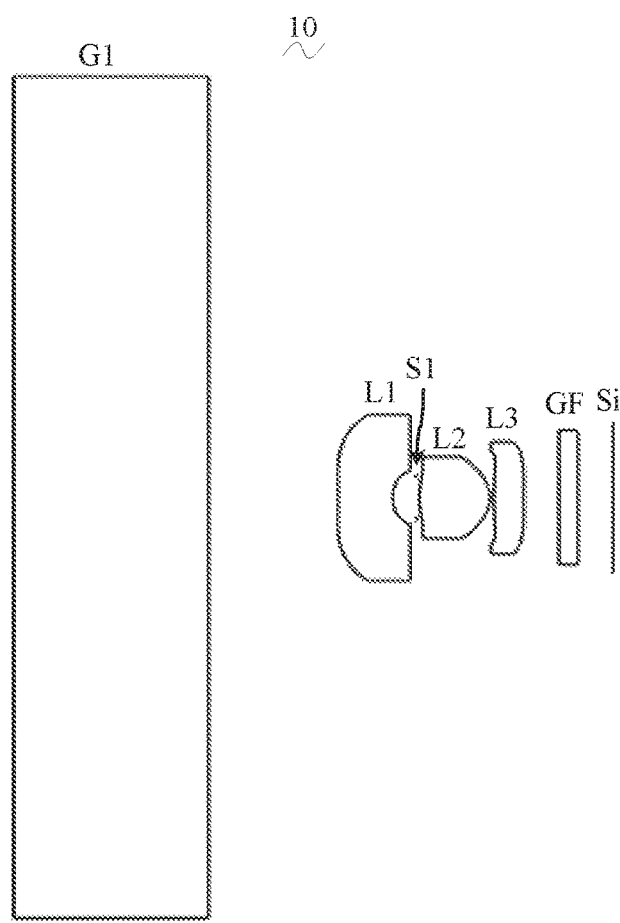
FIG. 1 is a schematic diagram of a structure of a camera optical lens according to Embodiment 1 of the present disclosure.

Referring to the drawings, the present disclosure provides a camera optical lens 10. FIG. 1 shows the camera optical lens 10 of Embodiment 1 of the present disclosure, the camera optical lens 10 includes four lenses. Specifically, the camera optical lens 10 includes, from an object side to an image side: a first glass plate G1; a first lens L1 having a negative refractive power, an aperture S1, a second lens L2 having a positive refractive power; a third lens L3 having a positive power; and an image surface Si. An optical filter GF can be further included and arranged between the third lens L3 and the image surface Si.

In this embodiment, a focal length of the third lens L3 is defined as f4, a focal length of the camera optical lens 10 is defined as f, and the camera optical lens 10 further satisfies the following conditions: $10.00<f4/f<31.00$. This condition specifies a ratio between the focal length of the third lens L3 and the focal length of the camera optical lens 10, through which a reasonable distribution in focal length is achieved and the camera optical lens 10 has better imaging quality and lower sensitivity.

An abbe number of the first lens L1 is defined as v2, an abbe number of the second lens L2 is defined as v3, and the camera optical lens 10 further satisfies the following conditions: $2.80<v3/v2<4.00$. This condition specifies a ratio between the abbe number of the first lens L1 and the abbe number of the second lens L2, which facilitates realizing ultra-thinness and correcting aberration.

A refractive index of the d line of the third lens L3 is defined as n4, and the camera optical lens 10 further satisfies the following conditions: $1.60<n4<2.10$. This condition specifies a refractive index of the third lens L3, which facilitates realizing ultra-thinness and correcting aberration.

An on-axis thickness of the second lens L2 is defined as d5, an on-axis distance from the image-side surface of the second lens L2 to the object-side surface of the third lens L3 is defined as d6, and the camera optical lens 10 further satisfies the following conditions: $5.00<d5/d6<21.00$. This condition specifies a ratio between the on-axis thickness of the second lens L2 and the on-axis distance from the image-side surface of the second lens L2 to the object-side surface of the third lens L3, which helps shortening a total optical length from the object-side surface of the first lens to an image surface of the camera optical lens 10 along an optical axis, thereby an ultra-thinness effect is realized.

A curvature radius of an object-side surface of the third lens L3 is defined as R7, a curvature radius of an image-side surface of the third lens L3 is defined as R8, and the camera optical lens 10 further satisfies the following conditions: $-5.00<(R7+R8)/(R7-R8)<-1.40$. This condition specifies a shape of the third lens L3, which facilitates molding of the third lens L3 and avoid poor molding and stress caused by excessive curvature radius.

A curvature radius of an object-side surface of the first lens L1 is defined as R3, an on-axis thickness of the first lens L1 is defined as d3, and the camera optical lens 10 further satisfies the following conditions: $-12.00<R3/d3<-8.00$. This condition specifies a ratio between the curvature radius of an object-side surface of the first lens L1 and the on-axis thickness of the first lens L1, within a range of which it helps improving optical performance of the camera optical lens 10.

A focal length of the camera optical lens 10 is defined as f, a focal length of the first lens L1, and the camera optical lens 10 further satisfies the following conditions: $-2.54 \le f2/f \le -0.80$. This condition specifies the negative refractive power of the first lens L1 in a reasonable range, which facilitates correcting the aberration of the camera optical lens.

A curvature radius of an object-side surface of the first lens L1 is defined as R3, a curvature radius of an image-side surface of the first lens L1 is defined as R4, and the camera optical lens 10 further satisfies the following conditions: $0.42<(R3+R4)/(R3-R4)<1.33$. This condition specifies a shape of the first lens L1, within a range of which it helps correct an on-axis aberration with the development towards ultra-thin and wide-angle lens.

An on-axis thickness of the first lens L1 is defined as d3, an on-axis distance from an object-side surface of the first glass plate G1 to the image surface Si is defined as TD, and the camera optical lens 10 further satisfies the following conditions: $0.04 \le d3/TD \le 0.15$, which facilitates realizing ultra-thinness.

A focal length of the second lens L2 is defined as f3, a focal length of the camera optical lens 10 is defined as f, and the camera optical lens 10 further satisfies the following conditions: $0.51 \le f3/f \le 1.85$, through which a reasonable distribution in optical power is achieved and the camera optical lens 10 has better imaging quality.

A curvature radius of an object-side surface of the second lens L2 is defined as R5, a curvature radius of an image-side surface of the second lens L2 is defined as R6, and the camera optical lens 10 further satisfies the following conditions: $0.27 \le (R5+R6)/(R5-R6) \le 0.89$. This condition specifies a shape of the second lens L2, within a range of which it helps soften refraction of light when passing through the lens, thereby effectively reducing aberration.

An on-axis thickness of the second lens L2 is defined as d5, an on-axis distance from an object-side surface of the first glass plate G1 to the image surface Si is defined as TD, and the camera optical lens 10 further satisfies the following conditions: 0.06≤d5/TD≤0.18, which facilitates realizing ultra-thinness.

An on-axis thickness of the third lens L3 is defined as d7, an on-axis distance from an object-side surface of the first glass plate G1 to the image surface Si is defined as TD, and the camera optical lens 10 further satisfies the following conditions: 0.02≤d7/TD≤0.08, which facilitates realizing ultra-thinness.

A focal length of the first glass plate G1 is defined as f1, and the camera optical lens 10 further satisfies the following conditions: f1=∞. In different exemplary embodiments, the first glass plate G1 can be a finger identification area of mobile phones, tablets or other touch screen devices.

Further, an F number of the camera optical lens 10 is defined as Fno, and the camera optical lens 10 further satisfies the following conditions: Fno≤1.61, so that the camera optical lens 10 has a large aperture and good imaging performance. A field of view of the camera optical lens 10 is defined as Fov, and the camera optical lens 10 further satisfies the following conditions: Fov≥120.00°, which facilitates achieving wide-angle. That is, when satisfying the above conditions, the camera optical lens 10 may have good optical performance and may satisfy the design requirement of wide angle, large aperture and fingerprint recognition. According to the characteristics of the camera optical lens 10, the camera optical lens 10 is especially fit for WEB camera lenses and mobile phone camera lens assemblies composed by such camera elements as CCD and CMOS for high pixels.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TD: an on-axis distance from an object-side surface of the first glass plate G1 to the image surface Si of the camera optical lens 10 in unit of mm.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in the table 1 and table 2.

TABLE 1

|  | R | d |  | nd |  | vd |
|---|---|---|---|---|---|---|
| S1 | ∞ | d0= | −3.104 |  |  |  |
| R1 | ∞ | d1= | 1.500 | nd1 | 1.5168 | v1 | 64.17 |
| R2 | ∞ | d2= | 1.000 |  |  |  |
| R3 | −4.398 | d3= | 0.422 | nd2 | 1.6610 | v2 | 20.53 |
| R4 | 0.372 | d4= | 0.207 |  |  |  |
| R5 | 0.992 | d5= | 0.544 | nd3 | 1.5483 | v3 | 74.24 |
| R6 | −0.300 | d6= | 0.029 |  |  |  |
| R7 | 2.526 | d7= | 0.230 | nd4 | 1.6056 | v4 | 43.93 |
| R8 | 4.799 | d8= | 0.275 |  |  |  |
| R9 | ∞ | d9= | 0.145 | ndg | 1.5168 | vg | 64.17 |
| R10 | ∞ | d10= | 0.275 |  |  |  |

In the table, meanings of various symbols will be described as follows.

S1: aperture;
R: curvature radius of an optical surface or central curvature radius of a lens;
R1: curvature radius of the object-side surface of the first glass plate G1;
R2: curvature radius of the image-side surface of the first glass plate G1;
R3: curvature radius of the object-side surface of the first lens L1;
R4: curvature radius of the image-side surface of the first lens L1;
R5: curvature radius of the object-side surface of the second lens L2;
R6: curvature radius of the image-side surface of the second lens L2;
R7: curvature radius of the object-side surface of the third lens L3;
R8: curvature radius of the image-side surface of the third lens L3;
R9: curvature radius of an object-side surface of the optical filter GF;
R10: curvature radius of an image-side surface of the optical filter GF;
d: on-axis thickness of a lens or on-axis distance between neighboring lenses;
d0: on-axis distance from the aperture S1 to the object-side surface of the first glass plate G1;
d1: on-axis thickness of the first glass plate G1;
d2: on-axis distance from the image-side surface of the first glass plate G1 to the object-side surface of the first lens L1;
d3: on-axis thickness of the first lens L1;
d4: on-axis distance from the image-side surface of the first lens L1 to the object-side surface of the second lens L2;
d5: on-axis thickness of the second lens L2;
d6: on-axis distance from the image-side surface of the second lens L2 to the object-side surface of the third lens L3;
d7: on-axis thickness of the third lens L3;
d8: on-axis distance from the image-side surface of the third lens L3 to the object-side surface of the optical filter GF;
d9: on-axis thickness of the optical filter GF;
d10: on-axis distance from the image-side surface to the image surface Si of the optical filter GF;
nd: refractive index of the d line;
nd1: refractive index of the d line of the first glass plate G1;
nd2: refractive index of the d line of the first lens L1;
nd3: refractive index of the d line of the second lens L2;
nd4: refractive index of the d line of the third lens L3;
ndg: refractive index of the d line of the optical filter GF;
vd: abbe number;
v1: abbe number of the first glass plate G1;
v2: abbe number of the first lens L1;
v3: abbe number of the second lens L2;
v4: abbe number of the third lens L3;
vg: abbe number of the optical filter GF.

Table 2 shows aspheric surface coefficients of each lens of the camera optical lens 10 according to Embodiment 1 of the present disclosure.

TABLE 2

| | Conic coefficient | Aspheric surface coefficients | | | | | | |
|---|---|---|---|---|---|---|---|---|
| | k | A4 | A6 | A8 | A10 | A12 | A14 | A16 |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| R3 | 1.3998E+01 | 1.5579E+00 | −5.1919E−01 | −1.8785E+01 | 1.0961E+02 | −2.8946E+02 | 3.8089E+02 | −1.9847E+02 |
| R4 | −6.2396E−02 | 2.5815E+00 | −2.8866E+02 | 4.9676E+04 | −2.2797E+06 | 5.1865E+07 | −5.5726E+08 | 2.2517E+09 |
| R5 | −5.9631E+00 | 9.2848E−01 | −2.6667E+02 | 1.8097E+04 | −7.5822E+05 | 1.8532E+07 | −2.3417E+08 | 1.1777E+09 |
| R6 | −7.0799E−01 | 5.3443E+00 | −1.1878E+02 | 3.0698E+03 | −5.3790E+04 | 5.3558E+05 | −2.7710E+06 | 5.8230E+06 |
| R7 | 1.6764E+01 | −5.8920E−01 | −6.5132E+00 | 1.0899E+02 | −1.2247E+03 | 3.2842E+03 | 6.5937E+03 | −4.2024E+04 |
| R8 | −1.0220E+01 | −3.3339E+00 | 2.7126E+01 | −1.6243E+02 | 6.0339E+02 | −1.9287E+03 | 4.2718E+03 | −4.4783E+03 |

In Table 2, k is a conic coefficient, and A4, A6, A8, A10, A12, A14 and A16 are aspheric surface coefficients.

$$y = (x^2/R)/[1 + \{1-(k+1)(x^2/R^2)\}^{1/2}] + A4x^4 + A6x^6 + A8x^8 + A10x^{10} + A12x^{12} + A14x^{14} + A16x^{16} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to Embodiment 1 of the present disclosure. P1R1 and P1R2 represent the object-side surface and the image-side surface of the first glass plate G1, P2R1 and P2R2 represent the object-side surface and the image-side surface of the first lens L1, P3R1 and P3R2 represent the object-side surface and the image-side surface of the second lens L2, P4R1 and P4R2 represent the object-side surface and the image-side surface of the third lens L3. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 |
|---|---|---|
| P1R1 | 0 | 0 |
| P1R2 | 0 | 0 |
| P2R1 | 1 | 0.115 |
| P2R2 | 0 | 0 |
| P3R1 | 0 | 0 |
| P3R2 | 0 | 0 |
| P4R1 | 1 | 0.145 |
| P4R2 | 1 | 0.065 |

TABLE 4

| | Number(s) of arrest points | Arrest point position 1 |
|---|---|---|
| P1R1 | 0 | 0 |
| P1R2 | 0 | 0 |
| P2R1 | 1 | 0.195 |
| P2R2 | 0 | 0 |
| P3R1 | 0 | 0 |
| P3R2 | 0 | 0 |
| P4R1 | 1 | 0.305 |
| P4R2 | 1 | 0.135 |

Figure 2:
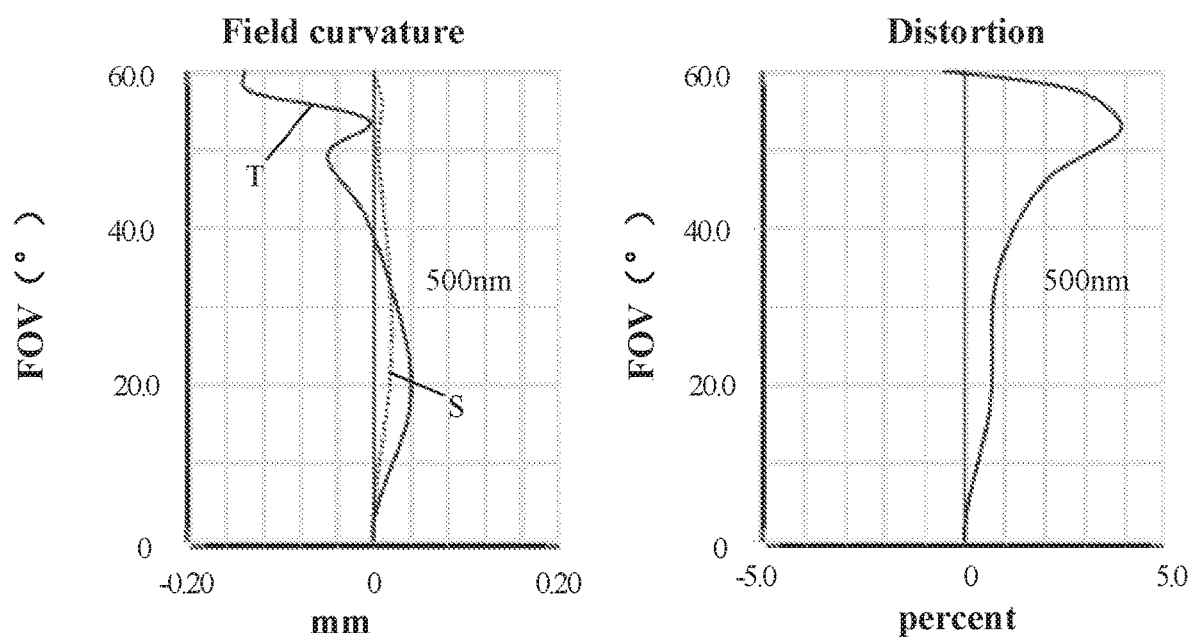
FIG. 2 is a schematic diagram of a field curvature and a distortion of the camera optical lens shown in FIG. 1.

FIG. 2 illustrates a field curvature and a distortion with a wavelength of 500 nm after passing the camera optical lens 10 according to Embodiment 1. A field curvature S in FIG. 2 is a field curvature in a sagittal direction, and T is a field curvature in a tangential direction.

Table 13 in the following shows various values of Embodiments 1, 2, 3 and values corresponding to parameters which are specified in the above conditions.

As shown in table 13, Embodiment 1 satisfies each condition.

In this embodiment, an entrance pupil diameter of the camera optical lens 10 is 0.249 mm, an image height of 1.0H is 0.675 mm, a FOV (field of view) in a diagonal direction is 120.00°. Thus, the camera optical lens 10 satisfy the design requirement of large aperture, wide angle and fingerprint recognition. Its on-axis and off-axis aberrations are fully corrected, thereby achieving excellent optical characteristics.

Embodiment 2

Figure 3:
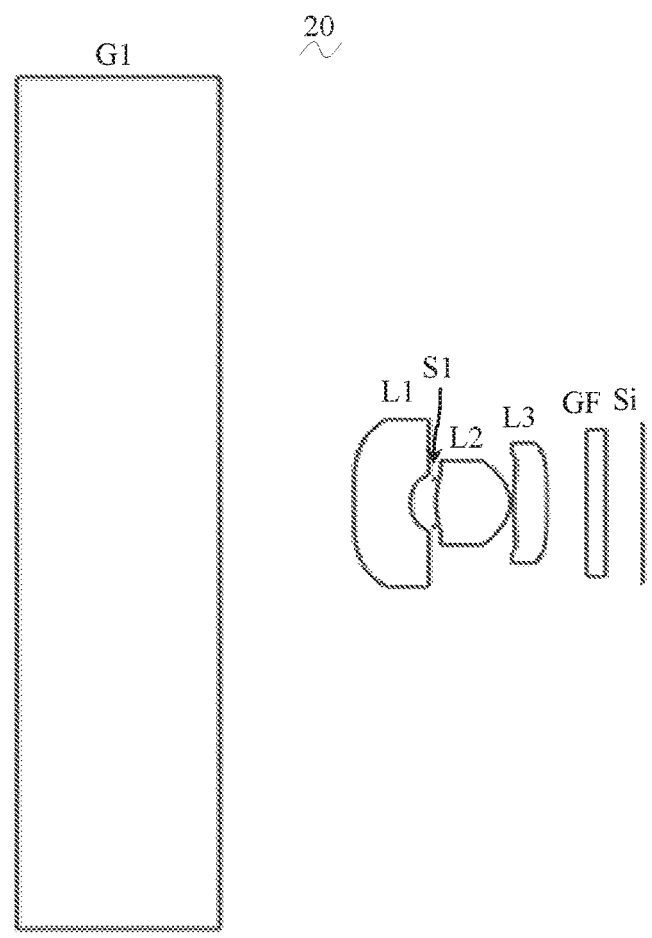
FIG. 3 is a schematic diagram of a structure of a camera optical lens according to Embodiment 2 of the present disclosure.

Embodiment 2 is basically the same as Embodiment 1 and involves symbols having the same meanings as Embodiment 1, a structure of a camera optical lens 20 according to Embodiment 2 of the present disclosure is shown in FIG. 3, and only differences therebetween will be described in the following.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0= | −3.092 | | | | |
| R1 | ∞ | d1= | 1.500 | nd1 | 1.5168 | v1 | 64.17 |
| R2 | ∞ | d2= | 1.000 | | | | |
| R3 | −6.201 | d3= | 0.416 | nd2 | 1.6610 | v2 | 20.53 |
| R4 | 0.375 | d4= | 0.191 | | | | |
| R5 | 1.036 | d5= | 0.547 | nd3 | 1.5286 | v3 | 76.98 |
| R6 | −0.310 | d6= | 0.027 | | | | |
| R7 | 2.328 | d7= | 0.247 | nd4 | 1.6689 | v4 | 44.96 |
| R8 | 11.844 | d8= | 0.293 | | | | |
| R9 | ∞ | d9= | 0.145 | ndg | 1.5168 | vg | 64.17 |
| R10 | ∞ | d10= | 0.275 | | | | |

Table 6 shows aspheric surface coefficients of each lens of the camera optical lens 20 according to Embodiment 2 of the present disclosure.

TABLE 6

| | Conic coefficient | Aspheric surface coefficients | | | | | | |
|---|---|---|---|---|---|---|---|---|
| | k | A4 | A6 | A8 | A10 | A12 | A14 | A16 |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| R3 | 2.0361E+01 | 1.5542E+00 | −5.1486E−01 | −1.8556E+01 | 1.1013E+02 | −2.8952E+02 | 3.8035E+02 | −1.9998E+02 |
| R4 | −6.1836E−02 | 1.7420E+00 | −2.5019E+02 | 4.9783E+04 | −2.2854E+06 | 5.1786E+07 | −5.5586E+08 | 2.2601E+09 |
| R5 | −1.1619E+00 | 3.3879E+00 | −2.7874E+02 | 1.7948E+04 | −7.5816E+05 | 1.8547E+07 | −2.3404E+08 | 1.1810E+09 |
| R6 | −6.9112E−01 | 5.1197E+00 | −1.1916E+02 | 3.0720E+03 | −5.3766E+04 | 5.3606E+05 | −2.7670E+06 | 5.8487E+06 |
| R7 | 1.9135E+01 | −5.9790E−01 | −6.1147E+00 | 1.1140E+02 | −1.2123E+03 | 3.3338E+03 | 6.7460E+03 | −4.1875E+04 |
| R8 | 4.4455E+02 | −3.2334E+00 | 2.7438E+01 | −1.6237E+02 | 6.0147E+02 | −1.9378E+03 | 4.2841E+03 | −4.3446E+03 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 |
|---|---|---|
| P1R1 | 0 | 0 |
| P1R2 | 0 | 0 |
| P2R1 | 1 | 0.095 |
| P2R2 | 0 | 0 |
| P3R1 | 0 | 0 |
| P3R2 | 1 | 0.345 |
| P4R1 | 1 | 0.235 |
| P4R2 | 1 | 0.055 |

TABLE 8

| | Number(s) of arrest points | Arrest point position 1 |
|---|---|---|
| P1R1 | 0 | 0 |
| P1R2 | 0 | 0 |
| P2R1 | 1 | 0.165 |
| P2R2 | 0 | 0 |
| P3R1 | 0 | 0 |
| P3R2 | 0 | 0 |
| P4R1 | 1 | 0.325 |
| P4R2 | 1 | 0.085 |

Figure 4:
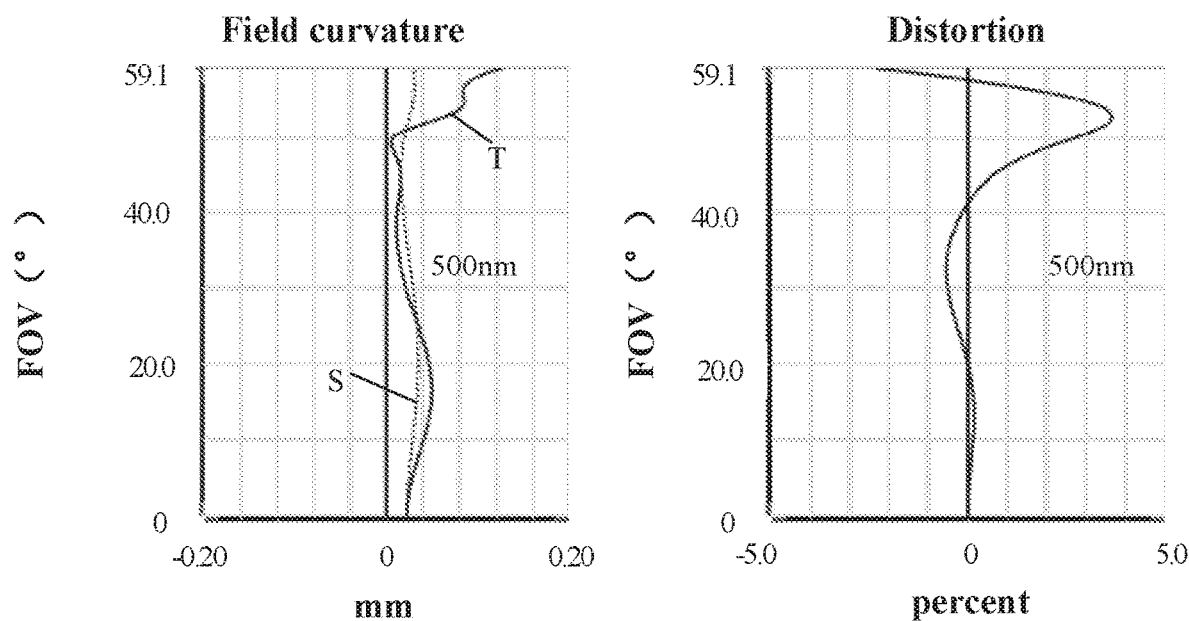
FIG. 4 is a schematic diagram of a field curvature and a distortion of the camera optical lens shown in FIG. 3.

FIG. 4 illustrates a field curvature and a distortion with a wavelength of 500 nm after passing the camera optical lens 20 according to Embodiment 2.

As shown in table 13, Embodiment 2 satisfies each condition.

In this embodiment, an entrance pupil diameter of the camera optical lens 20 is 0.266 mm, an image height of 1.0H is 0.675 mm, a FOV (field of view) in a diagonal direction is 118.20°. Thus, the camera optical lens 20 satisfy the design requirement of large aperture, wide angle and fingerprint recognition. Its on-axis and off-axis aberrations are fully corrected, thereby achieving excellent optical characteristics.

Embodiment 3

Figure 5:
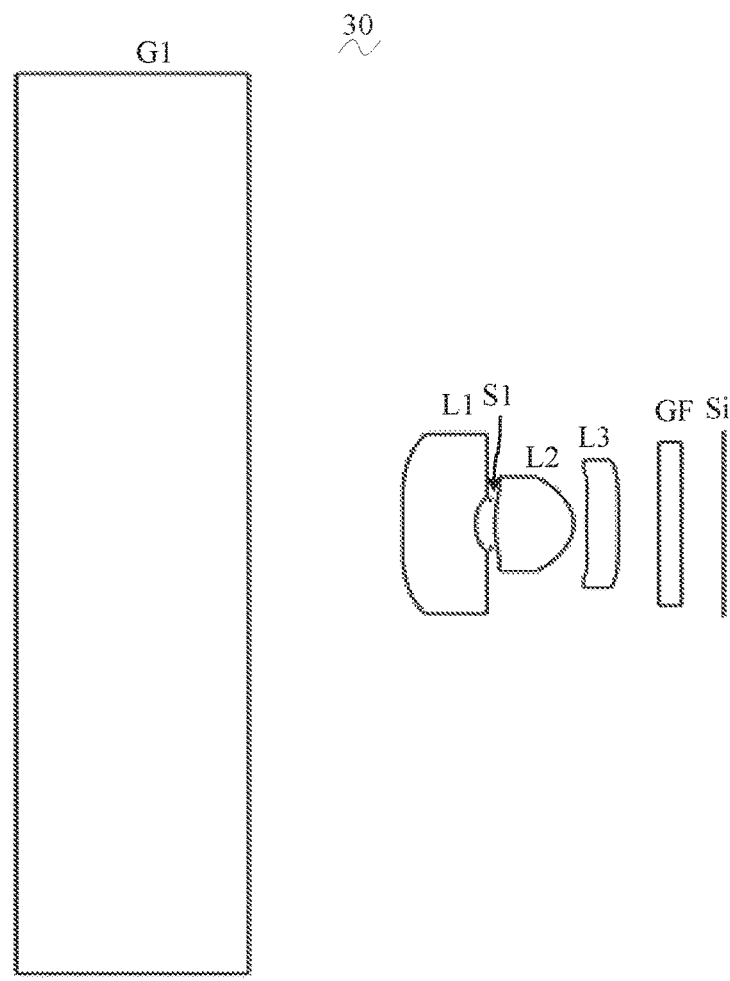
FIG. 5 is a schematic diagram of a structure of a camera optical lens according to Embodiment 3 of the present disclosure.

Embodiment 3 is basically the same as Embodiment 1 and involves symbols having the same meanings as Embodiment 1, a structure of a camera optical lens 30 according to Embodiment 3 of the present disclosure is shown in FIG. 5, and only differences therebetween will be described in the following.

Table 9 and Table 10 show design data of a camera optical lens 30 in Embodiment 3 of the present disclosure.

TABLE 9

| | R | d | nd | vd |
|---|---|---|---|---|
| S1 | ∞ | d0= −3.066 | | |
| R1 | ∞ | d1= 1.500 | nd1 1.5168 | v1 64.17 |
| R2 | ∞ | d2= 1.000 | | |
| R3 | −5.165 | d3= 0.468 | nd2 1.6610 | v2 20.53 |
| R4 | 0.431 | d4= 0.125 | | |
| R5 | 1.141 | d5= 0.506 | nd3 1.5725 | v3 57.52 |
| R6 | −0.291 | d6= 0.084 | | |
| R7 | 4.936 | d7= 0.210 | nd4 2.0220 | v4 29.06 |
| R8 | 7.449 | d8= 0.261 | | |
| R9 | ∞ | d9= 0.145 | ndg 1.5168 | vg 64.17 |
| R10 | ∞ | d10= 0.275 | | |

Table 10 shows aspheric surface coefficients of each lens of the camera optical lens 30 according to Embodiment 3 of the present disclosure.

TABLE 10

| | Conic coefficient | Aspheric surface coefficients | | | | | | |
|---|---|---|---|---|---|---|---|---|
| | k | A4 | A6 | A8 | A10 | A12 | A14 | A16 |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| R3 | 4.6075E+01 | 1.4934E+00 | −5.7582E−01 | −1.8611E+01 | 1.0976E+02 | −2.8979E+02 | 3.8054E+02 | −1.9845E+02 |
| R4 | 3.2391E−01 | 4.2707E+00 | −2.3053E+02 | 4.9739E+04 | −2.2934E+06 | 5.1636E+07 | −5.5997E+08 | 2.2268E+09 |
| R5 | −1.3027E+01 | 1.9400E+00 | −2.3550E+02 | 1.7763E+04 | −7.8390E+05 | 1.8573E+07 | −2.1972E+08 | 1.0233E+09 |
| R6 | −6.6018E−01 | 5.1871E+00 | −1.2426E+02 | 3.0502E+03 | −5.3676E+04 | 5.3841E+05 | −2.7609E+06 | 5.6900E+06 |
| R7 | −1.8337E+01 | −7.2907E−01 | −4.4170E+00 | 1.1998E+02 | −1.1913E+03 | 3.3261E+03 | 6.2731E+03 | −4.8289E+04 |
| R8 | 2.1371E+02 | −3.0592E+00 | 2.7284E+01 | −1.6243E+02 | 6.0035E+02 | −1.9146E+03 | 4.3560E+03 | −4.5730E+03 |

Table 11 and table 12 show design data of inflexion points and arrest points of each lens of the camera optical lens 30 lens according to Embodiment 3 of the present disclosure.

TABLE 11

|  | Number(s) of inflexion points | Inflexion point position 1 |
|---|---|---|
| P1R1 | 0 | 0 |
| P1R2 | 0 | 0 |
| P2R1 | 1 | 0.115 |
| P2R2 | 0 | 0 |
| P3R1 | 0 | 0 |
| P3R2 | 0 | 0 |
| P4R1 | 1 | 0.145 |
| P4R2 | 1 | 0.065 |

TABLE 12

|  | Number(s) of arrest points | Arrest point position 1 |
|---|---|---|
| P1R1 | 0 | 0 |
| P1R2 | 0 | 0 |
| P2R1 | 1 | 0.185 |
| P2R2 | 0 | 0 |
| P3R1 | 0 | 0 |
| P3R2 | 0 | 0 |
| P4R1 | 1 | 0.255 |
| P4R2 | 1 | 0.115 |

Figure 6:
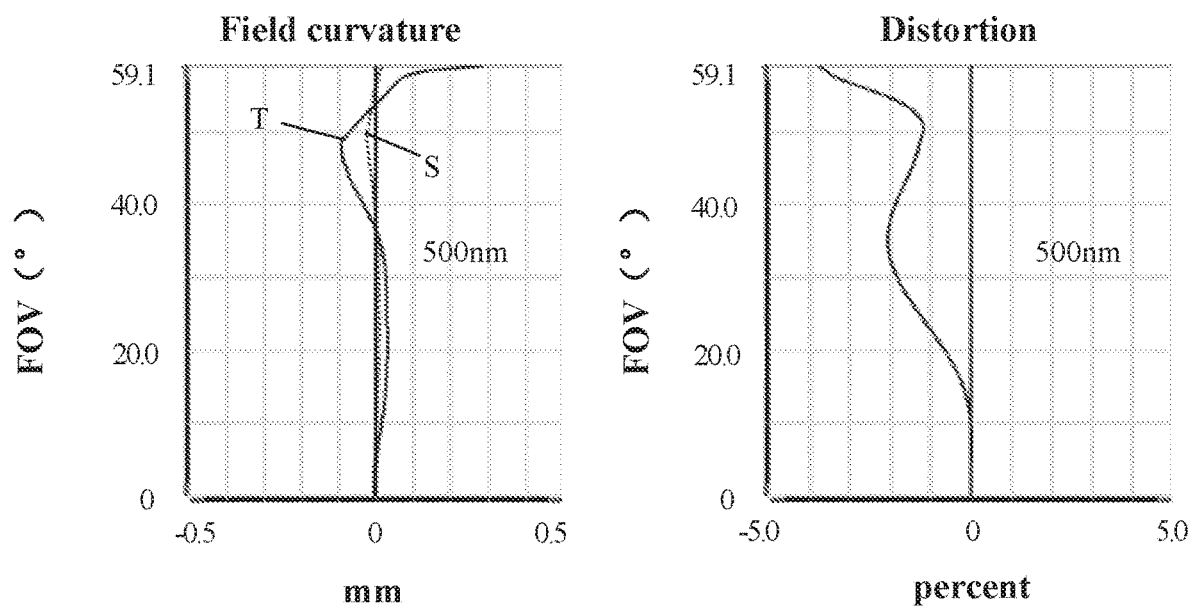
FIG. 6 is a schematic diagram of a field curvature and a distortion of the camera optical lens shown in FIG. 5.

FIG. 6 illustrates a field curvature and a distortion with a wavelength of 500 nm after passing the camera optical lens 30 according to Embodiment 3.

Table 13 in the following lists values corresponding to the respective conditions in an embodiment according to the above conditions. Obviously, the embodiment satisfies the above conditions.

In this embodiment, an entrance pupil diameter of the camera optical lens 30 is 0.282 mm, an image height of 1.0H is 0.675 mm, a FOV (field of view) in a diagonal direction is 118.20°. Thus, the camera optical lens 30 satisfy the design requirement of large aperture, wide angle and fingerprint recognition. Its on-axis and off-axis aberrations are fully corrected, thereby achieving excellent optical characteristics.

TABLE 13

| Parameters and conditions | Embodiment 1 | Embodiment 2 | Embodiment 3 |
|---|---|---|---|
| f | 0.399 | 0.425 | 0.451 |
| f1 | ∞ | ∞ | ∞ |
| f2 | −0.491 | −0.512 | −0.572 |
| f3 | 0.491 | 0.523 | 0.462 |
| f4 | 8.404 | 4.251 | 13.557 |
| f12 | −0.491 | −0.512 | −0.572 |
| f4/f | 21.06 | 10.00 | 30.06 |
| v3/v2 | 3.62 | 3.75 | 2.80 |
| n4 | 1.61 | 1.67 | 2.02 |
| d5/d6 | 18.76 | 20.26 | 6.02 |
| Fno | 1.60 | 1.60 | 1.60 |

The above are only embodiments of the present disclosure. It shall be indicated that those of ordinary skill in the art can make improvements without departing from the creative concept of the present disclosure, and these belong to the protection scope of the present disclosure.

What is claimed is:

1. A camera optical lens comprising, from an object side to an image side:
   a first glass plate;
   a first lens having a negative refractive power;
   a second lens having a positive refractive power;
   a third lens having a positive power; and
   an image surface;
   wherein the camera optical lens satisfies following conditions:

$10.00 < f4/f < 31.00;$ $2.80 < v3/v2 < 4.00;$ $1.60 < n4 < 2.10;$ and $5.00 < d5/d6 < 21.00;$ where
   f denotes a focal length of the camera optical lens;
   f4 denotes a focal length of the third lens;
   v2 denotes an abbe number of the first lens;
   v3 denotes an abbe number of the second lens;
   n4 denotes a refractive index of the third lens;
   d5 denotes an on-axis thickness of the second lens, and
   d6 denotes an on-axis distance from the image-side surface of the second lens to the object-side surface of the third lens.

2. The camera optical lens according to claim 1 further satisfying the following condition:

$-5.00 < (R7+R8)/(R7-R8) < -1.40;$ where
   R7 denotes a curvature radius of an object-side surface of the third lens; and
   R8 denotes a curvature radius of an image-side surface of the third lens.

3. The camera optical lens according to claim 1 further satisfying the following condition:

$-12.00 < R3/d3 < -8.00;$ where
   R3 denotes a curvature radius of an object-side surface of the first lens; and
   d3 denotes an on-axis thickness of the first lens.

4. The camera optical lens according to claim 1 further satisfying the following conditions:

$-2.54 \le f2/f \le -0.80;$ $0.42 < (R3+R4)/(R3-R4) < 1.33;$ and $0.04 \le d3/TD \le 0.15;$ where
   f2 denotes a focal length of the first lens;
   R3 denotes a curvature radius of an object-side surface of the first lens;
   R4 denotes a curvature radius of an image-side surface of the first lens;
   d3 denotes an on-axis thickness of the first lens; and
   TD denotes an on-axis distance from an object-side surface of the glass plate to the image surface of the camera optical lens.

5. The camera optical lens according to claim 1 further satisfying the following conditions:

$0.51 \le f3/f \le 1.85;$ $0.27 \le (R5+R6)/(R5-R6) \le 0.89;$ and $0.06 \le d5/TD \le 0.18;$ where f3 denotes a focal length of the second lens;

R5 denotes a curvature radius of an object-side surface of the second lens;

R6 denotes a curvature radius of an image-side surface of the second lens; and

TD denotes an on-axis distance from an object-side surface of the glass plate to the image surface of the camera optical lens.

6. The camera optical lens according to claim 1 further satisfying the following conditions:

$$0.02 \leq d7/TD \leq 0.08;$$

where d7 denotes an on-axis thickness of the third lens, and

TD denotes an on-axis distance from an object-side surface of the glass plate to the image surface of the camera optical lens.

7. The camera optical lens according to claim 1 further satisfying the following conditions:

$$Fov \geq 120.00°;$$

where

Fov denotes a field of view of the camera optical lens.

8. The camera optical lens according to claim 1 further satisfying the following conditions:

$$Fno \leq 1.61;$$

where

Fno denotes an F number of the camera optical lens.

* * * * *